3,388,303
SETTABLE LIMIT CONTROL DEVICE USING MATCHED PATTERNS
Howard E. Rommel, 451 Center Road,
Easton, Conn. 06425
Filed Sept. 4, 1964, Ser. No. 394,490
10 Claims. (Cl. 318—18)

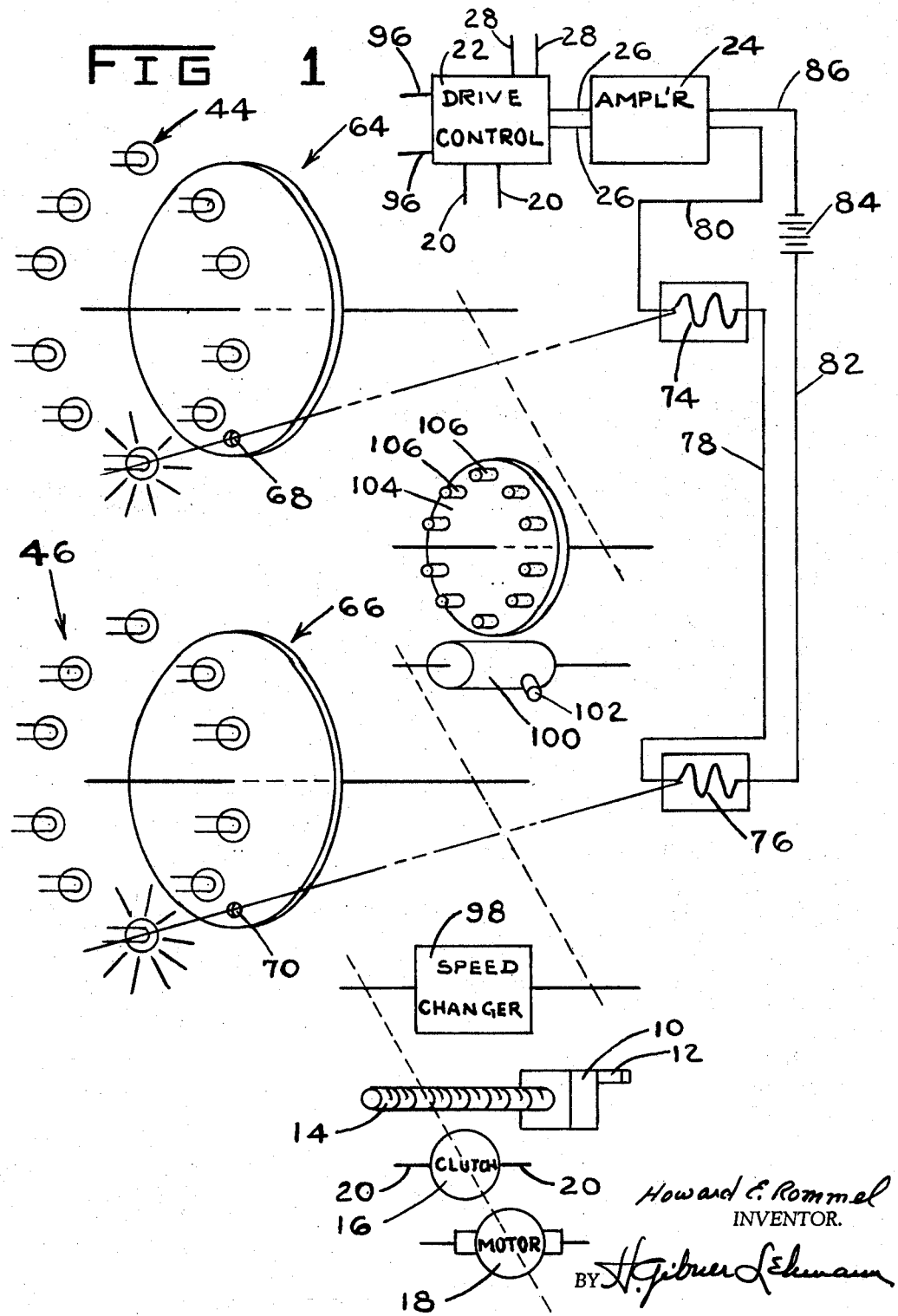

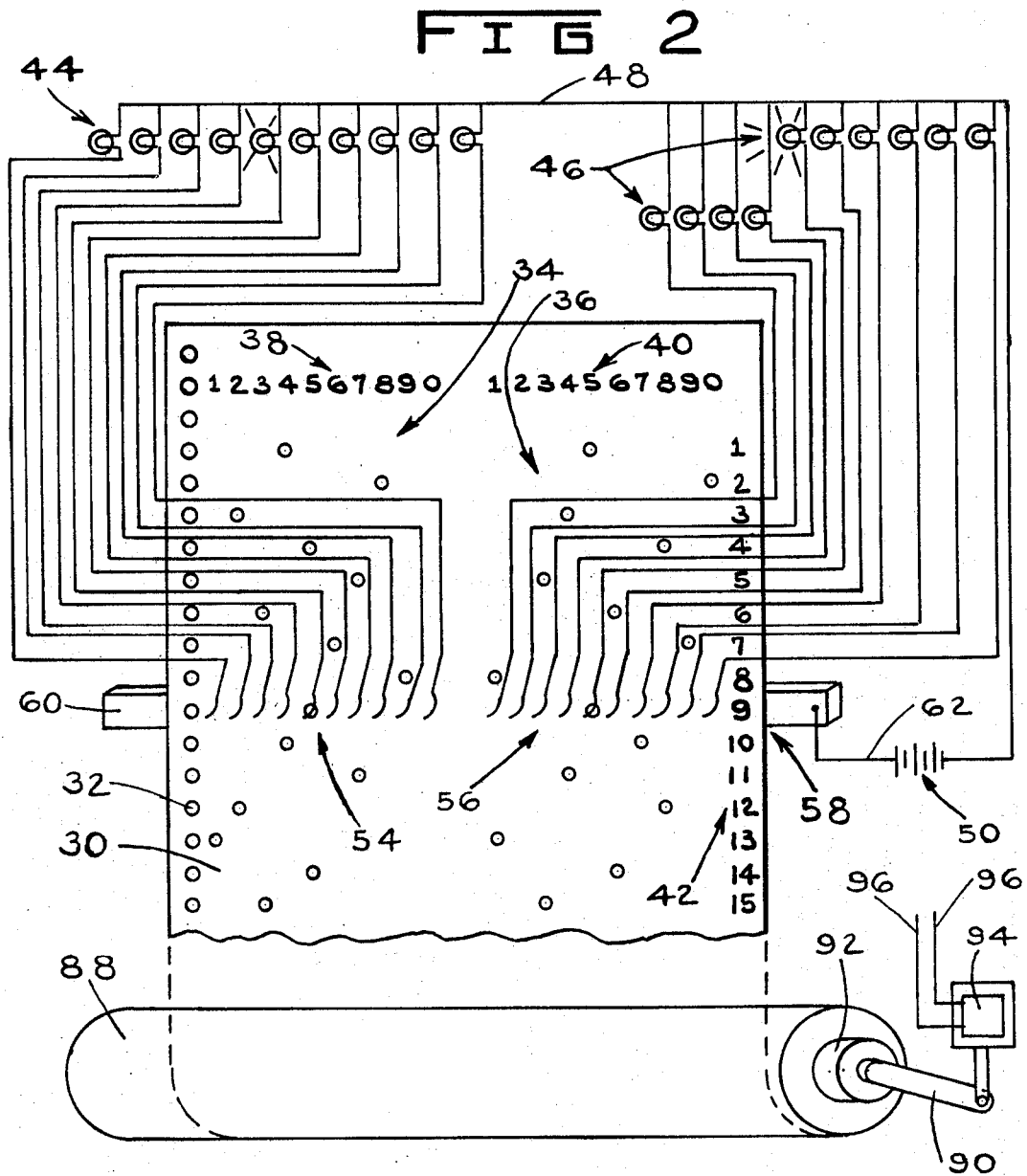

ABSTRACT OF THE DISCLOSURE

A limit control device for machine tools, having a master pattern tape controlling two banks of lamps. A variable pattern device comprises two movable shutters associated respectively with the banks of lamps. The pattern device varies with movement of the tool feed of the machine, and when it matches the master pattern displayed by the banks of lamps a control is activated to halt the tool feed, whereby the depth of cut of the tool has been automatically effected.

---

This invention relates to electrical controls, and more particularly to automatically operative controls which halt or limit a given operation, as when predetermined conditions are met.

The invention concerns improvements in controls of the type disclosed and claimed in my copending application Ser. No. 220,945 filed Aug. 29, 1962 and entitled "Machine Tool Electronic Feed Drive" now abandoned; and in my copending application Ser. No. 221,401, filed Aug. 29, 1962, and entitled, "Machine Tool Control System," now expressly abandoned.

In the first-mentioned copending application, pulses of different frequencies are utilized to effect the rates of speed of a cutting tool, and the advance of the tool is halted when a limit switch is operated by the advancing movement. The halting of the feed also simultaneously advances or indexes a program tape which was the instrumentality that initially selected the desired pulse frequency and established the rate of speed. The system utilized mechanically operated electric switches to effect the halting of the advance of the tool.

In the second-mentioned copending application, mechanically operated switches are utilized in conjunction with a program tape to halt the feed of a cutting tool, the control of the power which advances the tool being effected by a clutch arrangement which was actuated by paired stronger and weaker solenoids which were under the control of the limit switches through fast-acting sensitive relay devices. The halting of the tool feed occurred simultaneously with an advance or indexing movement of the program tape which instituted the next operation.

In accordance with the present invention, a simplified and effective control system is provided which does not involve mechanically operated limit switches as in my two copending applications to effect the halting of the tool feed. Instead the halting is the result of matching of two or more variable pattern devices controlling an electronic switching organization. By the pattern-matching concept, involving multiple sets of step-down geared patterns, a very fine and accurate control of the tool advance is obtained.

Accordingly, an object of the invention is to provide a novel and improved electrical type control device to effect a halting of a movable member or tool, wherein great precision and accuracy is obtainable in halting the feed of the member.

Another object of the invention is to provide an improved electrical control device in accordance with the foregoing, wherein the setting of the device to obtain the desired precise and fine control over the movement of the member involves relatively simple mechanisms and operations.

Yet another object of the invention is to provide an improved electrical-type control device as outlined above, which may utilize program tapes similar to the conventional punched tape, in establishing the desired limits or conditions which are to be attained.

A feature of the invention resides in the provision of a novel electrical-type control as characterized, wherein extremely simple yet wholly effective pattern devices are provided, to be matched one to the other for effecting the desired precise control.

Another feature of the invention resides in the provision of a control device of the type outlined, wherein banks of miniature electric lamps disposed in circles and rotary perforated shutter disks are cooperatively arranged in conjunction with a light responsive transducers, to constitute simple forms of the variable pattern device, in conjunction with step-type drives correlated to the number of lamps in the banks. Such arrangement results in extreme simplicity while still retaining a maximum degree of reliability of operation and precision.

Other features and advantages will hereinafter appear.

In the accompanying drawings:

FIG. 1 is a schematic or diagrammatic representation of a portion of the present improved electrical control, such portion including the variable pattern devices intended to be matched, and including most of the control system which is responsive to the matching of the pattern devices.

FIG. 2 is a diagrammatic representation of the remainder of the electrical control, this figure also showing a portion of the variable pattern devices depicted in FIG 1.

As shown herein, the present control system effects a limitation on the advancing movement of a movable member 10 which may, for instance, constitute the tool carriage of a machine tool, carrying a cutting tool or bit 12. The movable member or carriage 10 has feeding or advancing movement imparted to it by a power driven screw 14 which is in turn driven from a suitable clutch 16 and driving motor 18.

It will be understood that the drive from the motor 18 to the screw 14 may be through a suitable transmission or gear reduction device (not shown), located at either or both sides of the clutch 16. As illustrated herein the clutch 16 is of the electrically operated type, having control wires 20 leading from a drive control mechanism 22. The mechanism 22 may be constituted of electrically operated switches or relays having electrical actuator means or coils powered from an amplifier 24 through connections 26.

Input power to the drive control 22 may be provided through wires 28, whereby the switching function of said control can also provide energy to the wires 20, or cut off energy from the same in a well known manner. Thus, by this function the clutch 16 may be engaged or disengaged in response to a signal which excites the amplifier 24.

Energization and de-energization of the clutch 16 will respectively effect an advance of the carriage or movable member 10, and a halting of the same. In consequence, the advancing movement of the carriage 10 will result in a cutting movement of the tool 12, and a halting of the carriage 10 will have the effect of stopping the cut being made by the tool or cutting tip 12.

Referring now to FIG. 2 there is illustrated one type of punched program tape 30 which may be of any conventional kind, having feed apertures or holes 32 and banks of perforations indicated generally by the numerals 34, and 36. The bank of perforations 34 may be constituted of ten columns according to the series of numbers 38, and in a like manner the bank or group of apertures 36 may be constituted of a like number of columns indicated by the series of numbers 40. Also, the banks 34, 36 of apertures may be constituted of a large number of horizontal rows, as indicated by the series of numbers 42 at the right hand margin of the tape 30.

The placement of the apertures in the bank represents a certain pattern. As shown in the figure, in the ninth horizontal row there appears an aperture in column 5 of the bank 34, and also an aperture in column 5 of the bank 36. As will be seen later, the banks 34, 36 are related by a factor of 10, and accordingly these two designated apertures may represent the number 5.5. as an example.

For other positions of the program tape 30 other numbers would be represented. For example, considering the second horizontal row, the number 8.0 would be represented. For the third horizontal row, the number 2.4 would be represented, and so on.

The program tape may be of a still different yet conventional type wherein each horizontal row of the banks is replaced by a block of apertures, each block having ten horizontal rows, and as an example, five vertical columns. Other styles of tape may also be utilized.

In accordance with the present invention, the patterns or relationship represented by the illustrated apertures of the banks 34, 36 at the various positions shown in the horizontal rows 1, 2, 3 and so forth are reproducible in simple and unique, variable pattern devices comprising banks or electrical lamps 44, 46. Ten lamps are provided in each or the banks 44, 46 each lamp having one lead connected to a common bus or ground wire 48 which is joined to a battery 50, and the remaining terminals of the lamp being connected by wires to banks of contact fingers 54, 56. The contact fingers 54, 56 press against the surface of the program tape 30 at the respective column locations of the banks of apertures, said contact fingers being located in a single row at a sensing station designated generally by the numeral 58.

At such sensing station a contact bar 60 is provided, located behind and in engagement with the program tape 30, such bar being connected by a wire 62 to the remaining terminal of the battery 50. The arrangement is such that as an aperture is brought to the sensing station at the bar 58, the associated contact finger passes through the aperture and makes contact with the bar 60. When this occurs, a lamp of the banks 44, 46 will be illuminated.

As seen in FIG. 2, the fifth contact finger of each of the banks 54, 56 is making contact through the tape to the bar 60, whereby the fifth lamp of each of the banks 44, 46 is illustrated. The showing of the lamps 44, 46 in FIG. 2 is diagrammatic, such showing indicating the lamps as being in straight rows. However, actually the lamps are physically located in circles, and these are indicated in FIG. 1, wherein the upper circular bank of lamps is designated 22 and the lower circular bank of lamps is designated as 46.

It will be seen in FIG. 1 that in each of the banks of lamps 44, 46 the number 5 lamp (or lowermost one) is illuminated, corresponding to the conditions depicted in FIG. 2. The banks of lamps 44, 46 are herein termed variable pattern devices, inasmuch as the illumination of one lamp from each bank can represent a certain pattern, as well as a certain number. For instance, in FIG. 1 the number represented might be 5.5 since the fifth lamp of each bank is illuminated. Thus, by illuminating other lamps, other patterns or numbers may be established as 2.3 or 4.1, etc.

As will shortly be explained, a relationship exists between matching pattern devices associated with the banks of lamps 44, 46 whereby a 10 to 1 ratio is had, and thus the two numbers "5" may be thought of as representing the value 5.5. However, the two numbers "5" may also be thought of as representing 55 or .55 or 550 etc.

In accordance with this invention, a second pair of variable pattern devices comprising rotary disks 64, 66 is co- operably related to the first pattern devices comprising the lamps 44, 46. The disk 64 has a single aperture 68, and the disk 66 also has a single aperture 70. The axes of the disks may coincide with the axes of the circular banks of lamps 44, 46 whereby as a disk rotates light from any lamp of the banks may pass through the disk aperture, providing such lamp is of course illuminated.

Associated with the pattern devices 44, 64 and 46, 66 are light responsive transducers 74, 76. Such transducers may, for example, comprise conductive type photoelectric cells. The transducers 74, 76 are physically arranged in such a manner that they may receive light from any illuminated lamp of a bank provided that the aperture of the associated matching disk is aligned with the transducer and the particular lamp.

As seen in FIG. 1, for example, the transducer is receiving light from the fifth lamp of the bank 44, through the aperture 68 of the disk 64. And, the transducer 76 is receiving light from the fifth lamp of the bank 46, through the aperture 70 of the matching disk or pattern device 66.

The transducers 74, 76 are connected in series by a wire 78, and connected to the amplifier 24 by wires 80, 82 by a battery 84 and a final wire 86.

With such arrangement, it will now be understood that when the transducers 74, 76 are both illuminated and conducting, current will flow from the battery 84 to the amplifier 24 constituting a signal which excites the amplifier and renders operative the drive control 22. Such signal and the consequent operation of the drive control 22 results in the clutch 16 being disengaged, whereby the advance of the carriage 10 is halted.

Also, the drive control 22 may effect an advance or indexing movement of the tape 70, in the following manner. A drum 88 may be provided, on which the tape 30 is wound. Connected with the drum is a driving or advancing arm 90 and a ratchet mechanism 92. The arm 90 is operated by a solenoid 94 having lead wires 96 which are connected to switching elements (not shown) in the drive control 22. Thus, operation of the drive control 22 may result in energization of the solenoid 94 simultaneously with de-energization and disengagement of the clutch 16. In consequence, the halting of the carriage 10 will be accompanied by an indexing movement of the drum 88 and the tape 30, whereby the next row of apertures of the tape will be brought to the sensing station 58, for engagement by the banks of contact fingers 54, 56.

By this invention, the rotary disks 64, 66 are connected with each other through an intermittent, ratio-type drive whereby a 10 to 1 movement ratio is established between them. Also one of the disks (the disk 66) is driven continuously, simultaneously with the advancing movement of the carriage 10. In FIG. 1, driving connections are indicated between the screw 14 and the disk 66, through a suitable speed changer 98. Also, an intermittent drive device is shown in FIG. 1, comprising a drum 100 having a pin or projection 102, and a driven wheel 104 having ten pins or spokes 106 adapted for engagement one after another by the driving pin 102. The drum 100 and pin 102 have continuous rotary movement, in step with the lower pattern disk 66. For each complete revolution of the drum 100 and disk 66 the wheel 104 will be advanced through $\frac{1}{10}$ of a revolution, and such wheel has a driving connection indicated through the upper pattern disk 64, whereby the latter will also be advanced through $\frac{1}{10}$ of a revolution for each revolution of the lower disk 66. Thus, there is a step drive between the disks, having a ratio of 10 to 1, and the lower disk will have a continuous rotary movement whereas the upper disk will have intermittent rotary movement, each movement being through an arc of 36° for one complete revolution of the lower disk.

With such arrangement, different patterns are established by the positions of the apertures 68, 70 of the disks 64, 66. Such patterns may be represented, for example, by numbers. For instance, in FIG. 1 the pattern represented by the positions of the apertures of the disks 64. 66 is represented by the number 5.5; or else by the number 55; or by the number .55 etc.

The operation of the limit type control device of this invention may now be readily understood. The program tape 30 calls for various extents of movement of the moveable member 10. For instance, in row 9 of the program tape the two number 5 apertures represent a movement corresponding to the number 5.5, for instance. Or the number .55. When the tape 30 is advanced so that the ninth horizontal row is brought to the sensing station 58, the fifth lamp of each of the banks 44, 46 will be illuminated, as shown. The motor 18 will effect advance of the carriage 10 due to the clutch 16 being engaged. The disks 64, 66 will commence their movement from a starting position wherein the apertures 68, 70 are both located adjacent the number 1 lamp of the associated bank. The disks 64, 66 will be advanced, simultaneously with advance of the carriage 10, until the positions indicated in FIG. 1 are obtained, whereupon the transducers 74, 76 will be illuminated, sending a signal to the amplifier 24 and operating the switching drive control 22. This will result in the clutch 16 being disengaged, halting the advance of the carriage 10, and will also result in the solenoid 94 being energized, whereby the tape 30 will be advanced or indexed to the next horizontal row which in the present instance will be row number 8. Such advance will extinguish the five-five lamps of the banks 44, 46 and will illuminate the ninth lamp of the bank 44, and the first lamp of the bank 46. The disks 64, 66 may now have a starting position as shown in FIG. 1, (corresponding to the number 5.5) and these disks will continue to advance until a pattern is established corresponding to the number 9.1 which has been set by the eighth horizontal row of the tape 30. Upon the disks attaining such pattern, the transducers 74, 76 will be again illuminated, and the control operation described above will be repeated.

While in the present application only two banks of lamps and two disks have been illustrated, it will be understood that a greater number of banks of lamps and disks will ordinarily be employed, each additional disk being related to the preceding disk by a stepped drive having a ratio of 10 to 1, for instance. Thus, additional pattern devices may be provided, enabling many different combinations to be had representing two place, three place, four place, five place numbers, etc.

It will be understood that I have provided by the invention a simplified and effective control system which does not involve mechanically operated electric switches, but instead utilizes variable, matching pattern devices involving banks of lamps and light responsive transducers, the latter controlling an electronic switching organization. With this arrangement, a very fine and accurate control of a movable member is had, as regards the halting of the movement of such member. By adding additional matching pairs of lamps and disks, the fineness and precision of the control may be greatly increased.

This is in sharp contrast to prior, cumbersome and expensive electronic modular equipment based on the binary number system, and equipment involving matching selsyn motors, etc.

The means by which this accomplished is seen to be relatively simple and reliably operative, with but little chance of malfunctioning. The control may be readily utilized with program tapes similar to those already in existence, having punched holes. Tapes having other types of indicia, as for example electrically conductive spots, etc. may be substituted for the perforated tapes, as will be readily understood. The variable pattern devices are extremely simple, and may be economically produced and readily correlated without involving critical manufacturing operations.

Variations and modifications may be made within the scope of the claims, and portions of the improvement may be used without orders.

I claim:
1. In an electrical-type control device, in combination:
   (a) a movable member capable of advancing movement,
   (b) power means for driving said member,
   (c) a normally stationary settable pattern device operable when in its stationary condition and adapted to present different patterns at a read-out station,
   (d) a second and variable pattern device adapted for actuation to vary its pattern, said second, variable pattern device being cooperably related to the first pattern device and adapted to produce different patterns respectively matching those of the first pattern device,
   (e) said second and variable pattern device comprising a pair of movable members and drive means for continuously moving one member and intermittently moving the other member, said device further including means by which the pattern thereof is varied in response to said movements of the members,
   (f) means actuating said second pattern device simultaneously with advance of the movable member, to effect the said different patterns, and
   (g) means rendering inoperative said power means to advance the member when the second pattern device produces a pattern matching that for which the first pattern device is set.
2. An electrical control device as in claim 1, wherein:
   (a) the normally stationary settable pattern device comprises a tape having indicia thereon which may be presented consecutively at a read-out station, banks of selectively placed electric lamps, and means for energizing certain of said lamps in accordance with indicia of said tape location at said read-out station,
   (b) said means which renders inoperative the power means comprising light-responsive transducer means actuated by the lamps, and an electric-powered control device connected with the power means and operated by said transducer means.
3. An electrical control device as in claim 2, wherein:
   (a) the movable members of said second pattern device comprise apertured disks associated with the banks of lamps and arranged to selectively pass light therefrom to the transducer means, and said drive means comprises a step-drive between the disks to effect stepped movement of a driven disk at a slower total rate in response to movement of a driver disk at a faster rate.
4. An electrical control device as in claim 3, wherein:
   (a) each bank of lamps contains ten lamps, and
   (b) the step-drive between the said disks has a ten-to-one ratio,
   (c) each disk having but a single light-admitting aperture.
5. In an electrical-type control device, in combination:
   (a) a movable member capable of advancing movement,
   (b) power means of driving said member,
   (c) a normally stationary manually settable variable pattern device operable when in its stationary condition and adapted to present different patterns at a read-out station,
   (d) a second variable pattern device adapted for actuation to vary its pattern, said second, variable pattern device being cooperably related to the first pattern device and adapted to produce different patterns respectively matching those of the first pattern device,
   (e) said second and variable pattern device comprising a pair of movable members and drive means for continuously moving one member and intermittently moving the other member, said device further including means by which the pattern thereof is varied in response to said movements of the members, (f) means actuating said second second pattern device simultaneously with advance of the movable member, to effect the said different patterns, and (g) means rendering inoperative said power means to advance the member when the second pattern device produces a pattern matching that for which the first pattern device is set, (h) and means for automatically resetting the settable pattern device to present a different pattern at said read-out station simultaneously with the rendering-inoperative of the power means.

6. In an electrical-type control device, in combination:
(a) a movable member capable of advancing movement,
(b) power means for driving said member,
(c) a pair of light-responsive transducers,
(d) control means actuated in response to either simultaneous illumination of said transducers or darkening of at least one of the same, for rendering inoperative or operative said power means to effect halting or driving of said movable member,
(e) a normally stationary settable tape operable when in a stationary condition and having groups of selectively placed indicia thereon,
(f) banks of lamps arranged to respectively illuminate said transducers,
(g) movable shutter devices disposed respectively between said banks of lamps and transducers to control light to the latter from said lamps,
(h) means for selectively energizing certain lamps of said banks in a pattern established by the groups of indicia on said tape when the latter is placed in a given setting, and
(i) means including a stepped drive between the shutter devices, for sequentially shifting said shutter devices as the movable member advances, to enable passage of light to both said transducers at a predetermined point in the travel of the member, thereby to actuate the control means to halt the member.

7. An electrical control device as in claim 6, wherein:
(a) means are provided for moving the tape from said given setting in response to said actuation of the control means to halt the member.

8. An electrical control device as in claim 6, wherein:

(a) the movable member comprises a tool carriage,
(b) said means for driving the member comprising a screw feed for said carriage,
(c) said means for shifting the shutter devices comprising a transmission between one shutter device and said screw feed, said stepped drive comprising intermittent gearing between the shutter devices for effecting a stepped advance of the other device in response to continuous movement of the one shutter device.

9. An electrical control device as in claim 6, wherein:
(a) the shutter devices comprise rotary disks located between the lamp banks and transducers and having light-admitting openings,
(b) said lamp banks being circularly arranged and disposed broadside to said disks,
(c) said transducers being located to receive light from the lamps through the openings of the disks.

10. A machine tool including:
(a) a normally stationary control means having a series of preset numerical codes adapted to be indexed for presenting each of said preset numerical codes, said control means being located at a read-out station, and
(b) a member adapted to be moved along a path of travel,
(c) means for moving said movable member,
(d) photoconducting means operated in response to the movement of the movable member, providing a variable digitally changing numerical code, and
(e) means for terminating the movement of said movable member when the said digitally changing numerical code corresponds to that preset numerical code of the control means which is located at the read-out station and simultaneously indexing the control means to present at said read-out station the next successive preset numerical code.

References Cited
UNITED STATES PATENTS

| | | | |
|---|---|---|---|
| 2,882,475 | 4/1959 | De Neergard | 318—28 XR |
| 2,965,727 | 12/1960 | Passman | 200—46 |
| 3,078,404 | 2/1963 | Dumaire | 318—162 XR |
| 3,104,292 | 9/1963 | Holzer | 200—46 |
| 3,104,351 | 9/1963 | Rosenberg | 250—209 XR |

BENJAMIN DOBECK, *Primary Examiner.*